Nov. 12, 1929.　　　　C. R. DAY　　　　1,735,423
METHOD OF MANUFACTURING CAR WHEELS
Filed May 17, 1928　　　3 Sheets-Sheet 1

INVENTOR
Charles R. Day
by C. M. Clarke
Attorney

Nov. 12, 1929.　　　C. R. DAY　　　1,735,423
METHOD OF MANUFACTURING CAR WHEELS
Filed May 17, 1928　　　3 Sheets-Sheet 2

INVENTOR
Charles R. Day
by C. M. Clarke
attorney

Nov. 12, 1929.  C. R. DAY  1,735,423
METHOD OF MANUFACTURING CAR WHEELS
Filed May 17, 1928   3 Sheets-Sheet 3
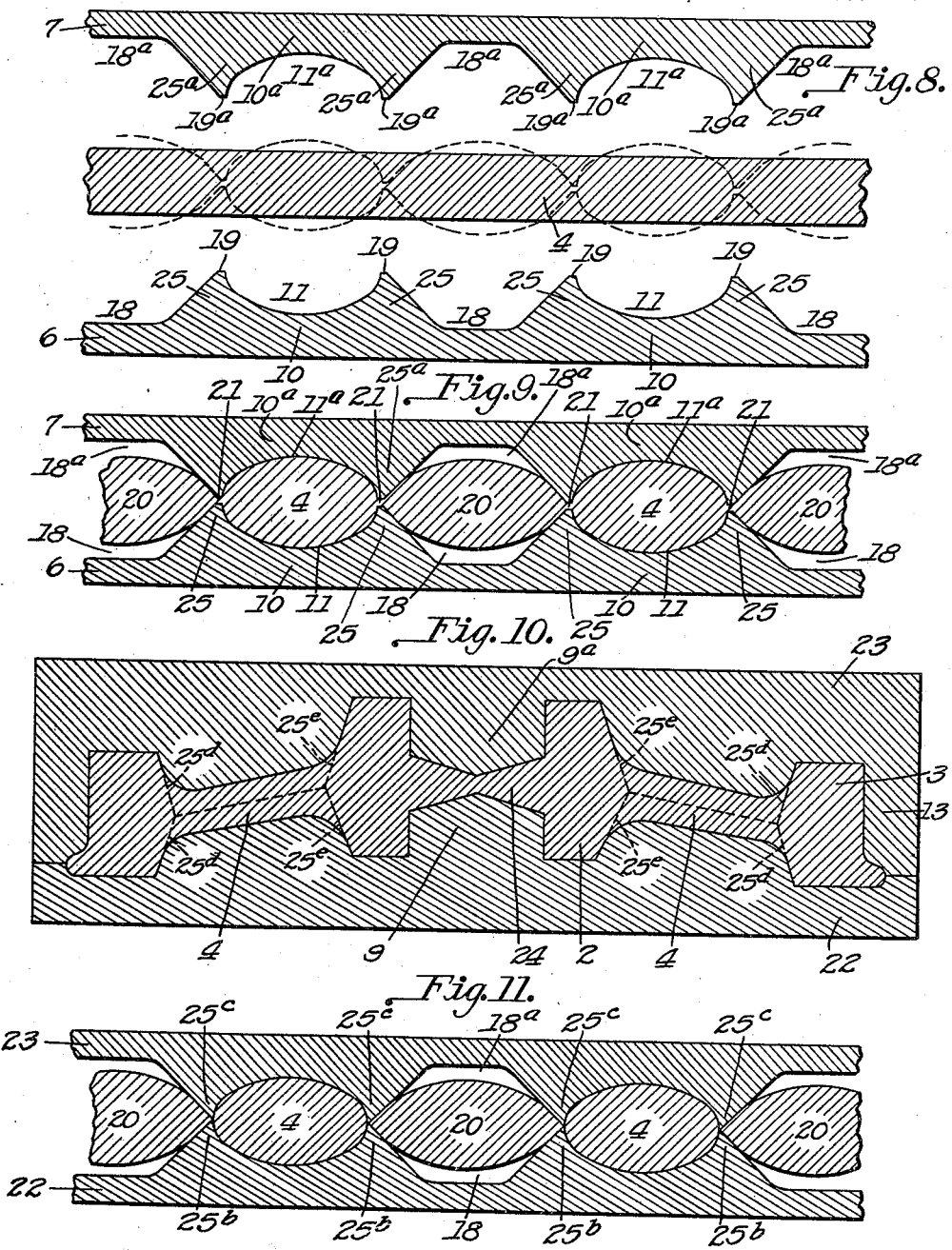

Patented Nov. 12, 1929

1,735,423

UNITED STATES PATENT OFFICE

CHARLES R. DAY, OF SEWICKLEY, PENNSYLVANIA

METHOD OF MANUFACTURING CAR WHEELS

Application filed May 17, 1928. Serial No. 278,580.

My invention relates to the manufacture of forged metal car wheels and the like, and consists in an improved method of forming a finished wheel from a forged or other blank, and in forging dies therefor. Heretofore such wheels have been made by pressing a blank to finished form having a hub portion, a tread portion, and an intervening web portion, either straight or dished, and then punching out portions of the web leaving radial spokes of the original thickness having shear-finished edge walls, as in prior patent of Hansen No. 1,007,947.

Such wheels are inherently weak and inefficient in that the cross sections of the spokes are of uniform thickness having squared unfinished or merely shear-finished edges. My invention provides reinforced spokes, oval in cross section, rounded at their opposite edges in either direction of rotation, and merging by rounded or filleted faces into the hub and rim portions respectively.

One preferred embodiment of the invention is shown in the accompanying drawings, in which:

Fig. 8 is an enlarged cross sectional view through that portion of the wheel blank indicated by the line VIII—VIII of Fig. 1 prior to closing action of the pressing and forming dies, the dies being open as in Fig. 2;

Fig. 9 is a similar section showing the dies closed;

Fig. 10 is a sectional view of the secondary or finishing dies closed, with the blank dished and the surplus waste material severed;

Fig. 11 is a view similar to Fig. 9 showing the final bending and blank detaching dies, closed on the blank, on the line VIII—VIII of Fig. 1.

Figure 1:
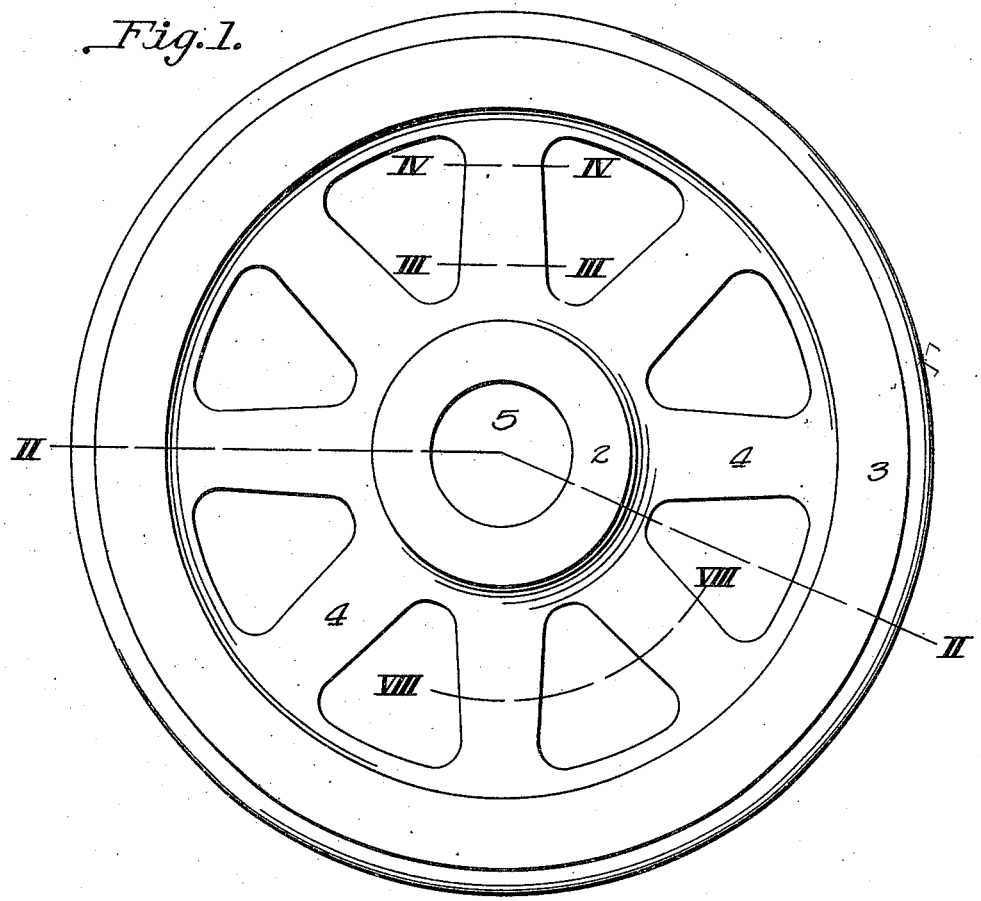
Fig. 1 is a face view of the finished wheel in elevation.
Figure 2:
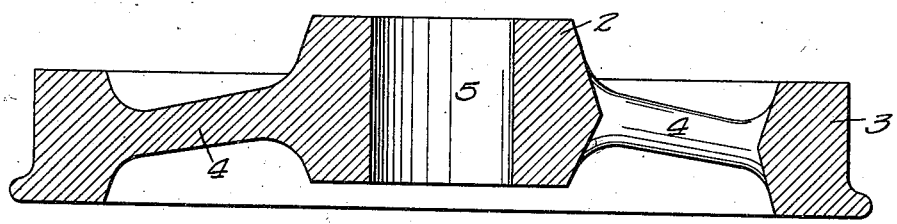
Fig. 2 is a cross section of the wheel on the deflected line II—II of Fig. 1.
Figure 4:
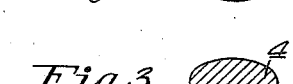
Fig. 4 is a similar view on the line IV—IV of Fig. 1.
Figure 3:
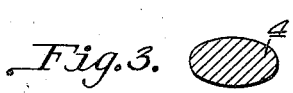
Fig. 3 is a cross section of the spoke on the line III—III of Fig. 1.
Figure 5:
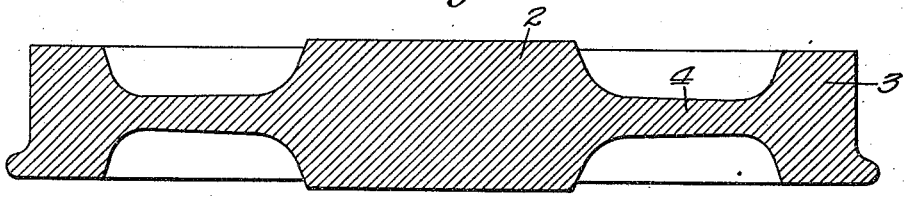
Fig. 5 is a cross sectional view of a wheel blank having a continuous integral web.
Figure 6:
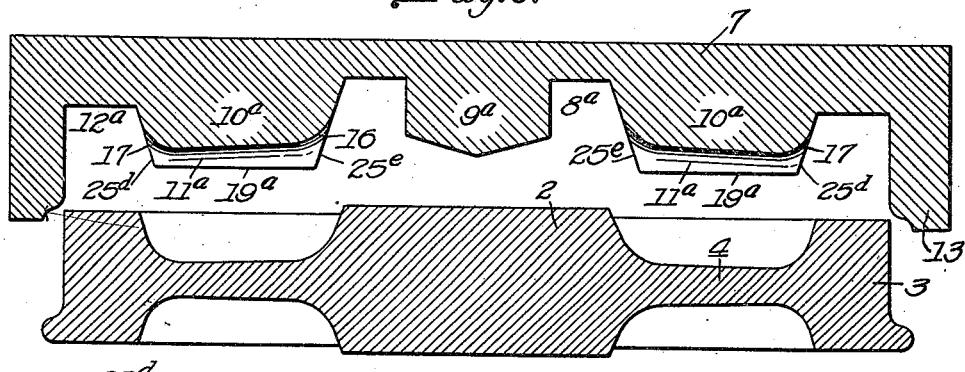
Fig. 6 is a sectional view showing the blank intermediate the upper and lower primary pressing and forming dies, separated and prior to action thereby.
Figure 7:
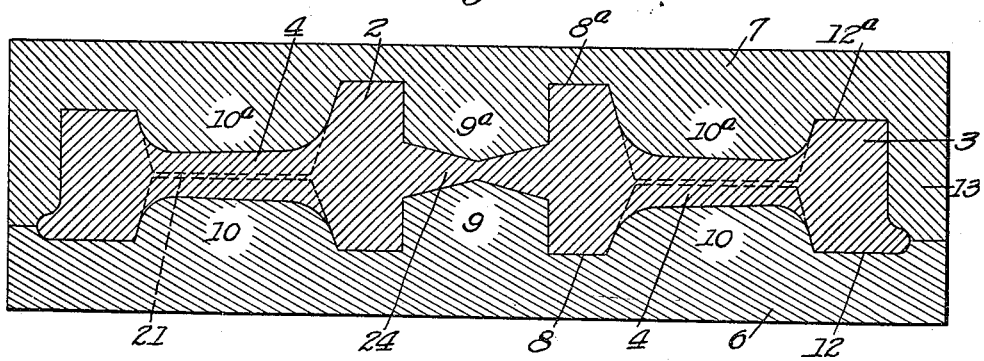
Fig. 7 is a similar view showing the blank in formed shape between the dies as closed.

The finished forged and dished wheel of Figs. 1 and 2 is made from the blank of Fig. 5 having a middle solid hub 2, an outer annular tread 3 and an intervening comparatively thin web 4.

The blank as thus provided is substantially flat, in which form it is first subjected to a primary die pressing and forging operation for initial shaping of the spokes 4 and the hub, with accompanying gathering and distribution of the metal and partial formation of the axle hole 5.

It is designed that the blank, under action of the preliminary and final forming and finishing dies, shall be compressed to approximately shape the spokes 4 in cross section; shall finish the hub by slightly increasing its thickness, with a partial axle opening at each side; and shall deflect or dish the middle portion of the wheel including the hub and the spokes, laterally with relation to the rim portion.

For such purpose the blank is subjected to the action of preliminary lower and upper dies 6 and 7 respectively, one acting against the other under the power of a suitbale press of well known construction, and not necessarily herein described. The lower or anvil die 6 is provided with a hub cavity 8, a central upstanding hole-forming center extension 9, upwardly extending portions 10 providing concaved spoke cavities 11, and an outer rim-forming annular cavity 12.

The upper or reciprocable die 7 is similarly provided with a middle annular hub-forming cavity 8ª, a central axle-hole forming projection 9ª, downwardly extending spoke-forming extensions 10ª having concaved spoke cavities 11ª, and an outer annular rim-forming cavity 12ª, with a supplemental surrounding outer portion 13 for co-operation with the lower die in forming the tread end flange, as will be readily understood.

Under action of dies 6 and 7, the blank of Fig. 5 is primarily treated for approximate formation of the hub and spokes, and with curving or filleted connection between the spokes and hub and rim respectively, as indicated. For such purpose the spoke cavities 11 and 11a, are rounded inwardly and outwardly, as indicated at 14—15 and 16—17 respectively, to a proper curvature and degree conforming with good practice, and dependent on the size and weight of the wheel body.

In the pressing operation the metal of the hub, and to some extent of the spokes, is extruded or gathered, resulting in a slight thickening of the hub due to the flowing of the metal from the central partial axle openings formed therein, together with an accompanying condensation of the metal.

Dies 6 and 7 respectively are also shaped to effect at the same time, an approximate formation of the spokes in cross section, and with incomplete severance of the metal between them.

For such purpose the dies 6 and 7 are provided with the spoke cavities 11 and 11a respectively, of approximately half oval form in cross section, diminishing in area outwardly toward the rim to provide the desired taper to the spokes.

Between the spoke-forming cavities 11 and 11a, each die is provided with intervening clearance openings 18 and 18a respectively, for clearance of such intervening surplus material, which is eventually eliminated from the blanks by the final dishing or bending operation hereinafter described.

The inner concave faces of spoke cavities 11 and 11a, and the inner opposite walls of cavities 18 and 18a converge toward a common partial severing line, providing the blunt edges 19 and 19a, whereby when the dies are brought together the spokes are not only approximately formed, but the surplus metal sections 20 are squeezed or pinched away from the spoke sections 4, but not entirely separated. The blunt edges 19 and 19a approach each other to within a slight distance, say one-eighth of an inch, leaving the thin intervening webs 21, as in Fig. 9. In such pressing operation the middle portions of the spokes 4 and of the surplus sections 20 will be gathered or reinforced, thickening them at their middle portion as shown, due to absorption of the surplus metal displaced by the separating wedge portions 25 and 25a between the several cavities.

The blank after such treatment is then placed between the finishing dies 22—23, as in Fig. 10, showing such dies closed. The dies are of the same general formation as the dies 6 and 7, but the hub cavity is re-located in each die, beyond the plane of the rim cavities, as indicated, whereby to effect the deflecting pressing or dishing of the hub, with inclined arrangement of the spokes, in the general form shown in Figs. 2 and 10. All of the main working portions of dies 22 and 23 are substantially the same as already described as to dies 6 and 7, but the intervening separating ridges 25b and 25c are in the form of blunt knife edges. These edges completely surround the triangular waste portions and are brought together in shearing action, so as to completely sever the waste sections 20 from the spokes, hub and rim, at the same time that the complete blank is dished and finally finished as in Fig. 11.

During each operation the waste sections 20 are also partially and then completely severed from the hub and rim respectively by the outer annular forging and shearing faces 25d and inner forging and shearing faces 25e of both the lower and upper dies. These inwardly projecting faces gather and assist in the final severance of the waste sections in the same manner as do the portions 25b and 25c.

The resulting effect of such final operation is to dish or bend the wheel section and at the same time remove the several surplus waste sections, and also to effectually finish the edge portions of the spokes and also the portions of the rim and the outer portions of the hub by the rounded and filleted formations and surfaces, leaving the wheel in complete finished condition, except as to the final axle hole. The intervening middle web portion 24 of the blank is removed by punching or boring, together with any necessary grinding or finishing operations for the rim and flange or faces of the hubs, all of which operations however are supplemental to the main forging steps and final shearing of the process.

What I claim is:—

1. In the manufacture of car wheels from a blank having a hub, web and rim, the method consisting in pressing the web between dies to form the spokes with accompanying separation and removal of intervening metal.

2. In the manufacture of car wheels from a blank having a hub, web and rim, the method consisting in pressing and severing the web between dies to remove surplus material between spoke sections with thickening thereof.

3. In the manufacture of car wheels from a blank having a hub, web and rim, the method consisting in pressing and severing the web between dies to remove surplus material between spoke sections with thickening thereof and simultaneous deflection of the hub and spoke sections beyond the rim.

4. In the manufacture of car wheels from a blank having a hub, web and rim, the method consisting in pressing and severing the web between dies to remove surplus material between spoke sections and between the hub and rim respectively with simultaneous thickening and rounding of the spoke sections.

5. In the manufacture of car wheels from a blank having a hub, web and rim, the method consisting in pressing and severing the web between dies to remove surplus material between spoke sections with thickening thereof and simultaneous deflection of the hub and spoke sections beyond the rim and partial formation of axle openings in the hub.

6. In the manufacture of car wheels from a blank having a hub, web and rim, the method consisting in first compressing the blank between dies to aproximately form radial spoke sections by partial severance of intervening metal therefrom and from the hub and rim, and then compressing the blank between dies to effect final severance of waste material with finishing formation of the spokes.

7. In the manufacture of car wheels from a blank having a hub, web and rim, the method consisting in first compressing the blank between dies to approximately form radial spoke sections by partial severance of intervening metal therefrom and from the hub and rim, and then compressing the blank between dies to effect deflection of the hub and spoke sections beyond the rim.

8. In the manufacture of car wheels from a blank having a hub, web and rim, the method consisting in first compressing the blank between dies to aproximately form radial spoke sections by partial severance of intervening metal therefrom and from the hub and rim, and then compressing the blank between dies to effect deflection of the hub and spoke sections beyond the rim with final severance of waste material from between the spokes.

In testimony whereof I hereunto affix my signature.

CHARLES R. DAY.